United States Patent [19]

Berreman et al.

[11] 4,239,345
[45] Dec. 16, 1980

[54] BISTABLE LIQUID CRYSTAL TWIST CELL

[75] Inventors: Dwight W. Berreman, New Providence; William R. Heffner, Plainfield, both of N.J.

[73] Assignee: Bell Telephone Laboratories, Incorporated, Murray Hill, N.J.

[21] Appl. No.: 30,172

[22] Filed: Apr. 16, 1979

[51] Int. Cl.³ ............................................. G02F 1/137
[52] U.S. Cl. ................................. 350/331 R; 350/334; 350/341; 350/350 R; 252/299
[58] Field of Search .................. 350/331 R, 334, 341, 350/349, 346, 351, 350; 252/299

[56] References Cited
U.S. PATENT DOCUMENTS

| | | | |
|---|---|---|---|
| 3,650,603 | 3/1972 | Heilmeir et al. | 350/331 R |
| 3,703,331 | 11/1972 | Goldmacher et al. | 350/331 R |
| 3,836,243 | 9/1974 | Melchior | 350/351 |
| 4,128,313 | 12/1978 | Cole et al. | 350/341 X |

*Primary Examiner*—Edward S. Bauer
*Attorney, Agent, or Firm*—Samuel H. Dworetsky

[57] ABSTRACT

A bistable liquid crystal twist cell is disclosed. The cell is characterized by at least two stable states which exist indefinitely as long as not external energy is applied to the cell. External energy is necessary only for switching the cell between the stable states. Cell configurations which permit the fabrication of patterned displays are additionally disclosed. Specific embodiments include new techniques for switching the cell between the stable states.

11 Claims, 3 Drawing Figures

BISTABLE LIQUID CRYSTAL TWIST CELL

BACKGROUND OF THE INVENTION

1. Field of the Invention

This invention involves bistable liquid crystal cells.

2. Description of the Prior Art

The influence and effect of ordered molecules has been used in diverse applications to fabricate devices for switching, modulating and otherwise altering the characteristics of light rays. Liquid crystals, which comprise ordered molecules or groups of molecules in a liquid state, are found to be particularly useful in this regard, since the degree and nature of the ordering can be varied relatively easily to obtain concomitant changes in the transmission properties of the liquid. Differences in transmission, and in the polarizing effect of such liquid crystals, have both been utilized to obtain the now commonly used displays, such as those evidenced by the proliferation of liquid crystal wristwatches. However, it would often be more practical to have a liquid crystal which would have associated with it two stable states, and which can be easily transferred from one stable state to the other, rapidly and with a minimum expenditure of energy. In such a device, little or no energy would be needed to maintain the crystal in either one of the two stable states.

Previous workers have investigated the characteristics of pseudo-stable states in nematic liquid crystals, both twisted and untwisted. However, the absence of a commercial bistable liquid crystal device attests to the failure of the prior art in obtaining a practical and efficient bistable liquid crystal display.

SUMMARY OF THE INVENTION

This invention is a bistable liquid crystal cell. The cell has associated with it two stable states which exist indefinitely without the application of energy, but which may be switched upon the application of appropriate switching energy. The liquid crystal cell includes a cholesteric liquid crystal contained within two bounding surfaces. The liquid crystal is constrained in at least one of these stable states to a helicity other than its normal unstrained helicity. In the stable states, the liquid crystal is substantially free of disclinations and walls. The cell may be switched between at least two stable states without passing a disclination across the active region. The switching may be effected by the prior art mutliple frequency addressing technique or by newly discovered techniques involving specific turn-off times of appropriately applied fields with specified fall time characteristics. Specific embodimednts include configurations in which specific regions of the cell are "isolated" to obtain pattened displays.

DETAILED DESCRIPTION

1—THE INVENTION

Figure 1:
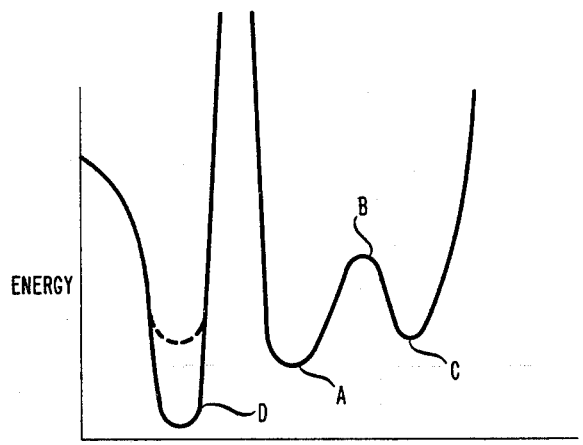
FIG. 1 is an energy diagram of the various states associated with an exemplary embodiment of this invention.

This invention is rooted in the recognition that within the mathematical description of liquid crystal twist cells there exists a family of solutions whose properties include bistability. In the context of this application, bistability refers to the fact that the liquid crystal, under the influence of the boundary conditions imposed upon it, can exist in at least two different states, either of which exists indefinitely until specific steps are taken to cause a transition to another state. These states will exist indefinitely even without the imposition of external energy, such as, for example, an electric field. This definition of bistability, which is consistent with the usage by those skilled in the art, highlights the advantages of the inventive cell. Specifically, energy is expended only when it is desired to transfer the cell from one state to the other. At all other times, the cell will remain in the desired state without the expenditure of energy. The usage of the term "indefinitely" with regard to the lifetime of the stable states is not meant to be rigorous, but rather refers at least to time periods long compared to the switching time, and in many embodiments, to times comparable to the chemical life of the cell and its components. The mathematical solutions, as currently understood however, in fact demonstrate absolute stability until external perturbing forces are applied. As currently understood, these external forces appear only in the form of the above-disclosed switching fields. There is currently no evidence of undesirable and otherwise uncontrollable forces that will result in finite lifetimes of the stable states.

In its most pristine form, the invention is best described by those mathematical solutions which dictate bistability. These mathematical solutions are generated from the equations which describe the various energy contributions and physical phenomena associated with liquid crystal twist cells. The energy contributions include terms attributed to twist, splay, and bend elastic energy, which arise at least in part as a result of externally imposed conditions, such as, for example, constraints associated with the cell walls, and contributions due to the imposition of fields, e.g., electric, magnetic, and electromagnetic fields. These equations, which can be solved by utilizing highly sophisticated numerical methods, have an essentially infinite number of solutions, most of which are uninteresting and irrelevant. Among these vast number of solutions are those which applicants have discovered, and which include bistable phenomena. These solutions appear for specified boundary conditions and specific values of the parameters in the energy equations such as, for example, splay, twist and bend elastic constants.

While the mathematical description of the invention is perhaps the most rigorous, its unwieldy character has lead applicants to describe the inventive cell in terms of its primary characteristics and parametric properties. This qualitative definition calls for a cell containing a liquid crystal which has associated with it a specific value of twist when it is not strained. To this extent, the liquid crystal may be described as cholesteric, that is, in the absence of any constraint, the lowest energy state of the liquid crystal assumes a helical configuration with a specific pitch. The liquid crystal may be viewed as having associated with it directors which will define a helix of appropriate pitch. For the purposes of this application, the pitch of the cholesteric in the unstrained state is referred to as "unstrained pitch".

Characteristic of the inventive cell is that fact that in at least one of the stable states, the liquid crystal within the cell is constrained to a pitch of a value other than its unstrained pitch. This constraint may be effected by appropriately treating the cell walls with an aligning surfactant, by etching it with grooves, or by applying asymmetric evaporated coatings. The liquid crystal in the active region of the cell is substantially free of disclinations and domain walls while in the stable state.

When these conditions are inserted in the mathematical description of the cell, it is found that there exists a family of solutions for which the liquid crystal can exist in either of at least two stable states. Furthermore, it is a characteristic of these solutions, and of the inventive cell, that the liquid crystal can be transformed from one stable state to another by the imposition of external energy, and that this transformation will usually occur without the passage of the liquid crystal through a disclination, or without passing a disclination across the active region. This requirement will yield switching with relatively low inputs of switching energy.

2—ENERGETICS OF THE INVENTIVE CELL

Figure 2:
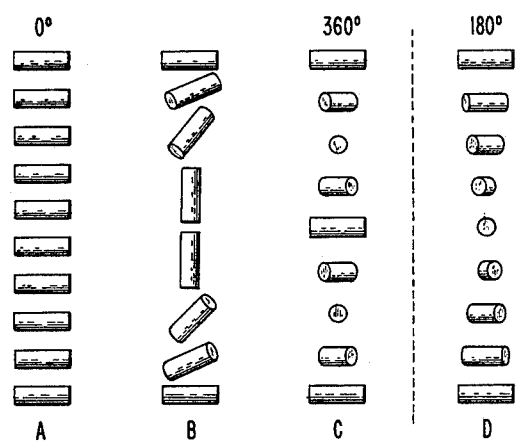
FIG. 2 is a schematic representation of the liquid crystal directors when in the various states shown in FIG. 1.

An energy diagram of an exemplary embodiment is shown schematically in FIG. 1. In this FIG., there are shown three stable states identified as A, C and D. The configuration assumes by the liquid crystal directors when in these states are shown in FIG. 2. In energy state A, the directors are untwisted. It is important to note that the existence of such a state is not inconsistent with the liquid crystal being referred to as a cholesteric, inasmuch as the twist normally associated with a cholesteric need be present only in the lowest energy, unstrained, state, which is not necessarily shown, and which, in fact, may not be allowed by certain specific boundary conditions. In state C, the directors assume the configuration represented in FIG. 2C. A third stable state, identified as D and shown schematically as FIG. 2D, is also shown. In the embodiment of FIGS. 1 and 2, state D may be unstrained. Imposition of a field, usually in the frequency range of $0-10^5$ Hz or $0-10^4$ Hz and, in a specific embodiment, perpendicular to the cell walls, will result in state B if the field is sufficiently strong, e.g., 1-100 volts. State B will exist as long as the field is imposed. Removal of the field, as described below, will result in either state A or C, both of which are stable, depending upon the details of the field's removal, or its strength while on.

It is important to understand the nature of state D and the role that it plays, or does not play, in the bistable device. In order to switch the cell from either states A or C to state D, more energy is required than to switch between states A and B, as shown schematically in FIG. 1 by the high potential barrier separating these various states. The potential barrier in this case is associated with a disclination through which the liquid crystal twist must pass before state D can be achieved. It was felt at one time by applicants that in order for state D to be avoided, the energy of state D would have to be higher than that of states A or C, as shown by the dotted line in FIG. 1. Such an increase in energy might be effected, for example, by the introduction of additional splay energy which might be associated with relatively large tilt angles at the cell surfaces, e.g., 45 degrees. (Equal tilt at both of the cell walls introduces more splay energy into the description of state D than into the description of states A or C.) However, applications have discovered that the height of the barrier separating state D from the other states is so great that even if state D is of lower energy than the other states, as shown, effective switching can be imposed between states A and C without raising the energy high enough to cause the liquid crystal to pass through the disclination and effect a transition to the state D.

In the embodiment discussed in FIGS. 1 and 2, the unstrained free pitch of the liquid crystal is approximately 180 degrees, i.e., the configuration of state D. Clearly, this parameter is governed by the nature of the liquid crystal and the wall spacing. In various alternative embodiments, values other than 180 degrees might be used. For example, if significant tilt is imposed upon the liquid crystal at the boundary walls, the most desirable solutions might have unstrained pitches of as much as 270 degrees or as small as 90 degrees. In such configurations, states A and C will most likely still be separated by approximately 360 degrees, i.e., however, the pitch of these states need not be 0 degrees and 360 degrees respectively.

A detail of the configuration shown in FIG. 2 has been specifically omitted in the diagram in order to make the Figure more readily comprehensible to those who have little exposure to liquid crystal twist cells. This detail involves the fact that the directors adjacent to the surfaces in states A, C and D are tilted relative to the cell walls by an amount anywhere from 1-60 degrees. The directors adjacent to either of the walls are tilted in a manner so that they are parallel. In states A and C this tilt may be essentially uniform throughout the thickness of the cell. In state D, however, the director orientation may vary in tilt being parallel to the cell wall at some midplane. Such a configuration introduces additional splay energy to state D yielding the energy level shown by the dotted line in FIG. 1 for sufficient tilt.

The tilt serves two purposes. First, it removes an ambiguity which would otherwise be present when the switching field which raises states A or C to state B is applied. The tilt additionally introduces the additional splay term described above which raises the energy of state D to a level above that of states A or C.

A further inaccuracy in FIG. 2, purposely inserted to simplify the Figure, is that the directors in the center of the cell in the configuration of state B are not exactly perpendicular.

THE SWITCHING MECHANISM

The switching between states A and C is effected by introducing into the cell energy which first causes a transition to an intermediate state such as that shown as B in FIG. 2. Subsequent removal of the field will then result in a further transition to state A or state C. Prior art switching mechanisms may be utilized to effect the required transitions. Such switching mechanisms will include the two-frequency switching methods described by Gerritsma for a 90 degree twisted nematic cell (Gerritsma, et al, *Solid State Comm.* 17, 1077 (1975)). This mechanism depends upon the frequency dependence of the dielectric anisotropy of the liquid crystal and the fluid dynamic characteristics of the liquid crystal (C. J. Van Doorn, *J. App. Physics* 46, 3738 (1957)) to yield either forward or backward relaxation of the directors from their position in state B.

However, in addition to the prior art Gerritsma two-frequency mechanism, applicants have discovered alternative switching techniques which are effective and particularly useful in the inventive device. These include different rates of change of the field, during the turn-off period which occurs during switching, to obtain relaxation to either state A or state C. (e.g., 1/100 of a second for slow turn-off of a 5 micron cell to yield state A and approximately an order of magnitude less for fast turn-off to yield state C. These numbers vary approximately with the square of the cell thickness). Still further switching techniques discovered by applicants for use with the inventive cell include the utilization of fields of different magnitudes depending upon which final state is desired. In a broad sense, this mechanism might be included within the previously mentioned mechanism that depends on rate of decrease of the field.

4—CELL CONFIGURATIONS

Figure 3:
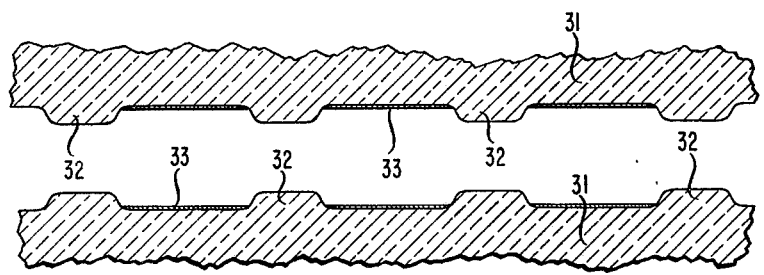
FIG. 3 is a specific embodiment of the inventive liquid crystal cell.

In some embodiments, the entire cell must be switched on or off. However, in many display embodiments, alphanumeric characters or other patterns must be defined. In prior art cells whose various states require the continued application of external fields, these characters were easily defined by appropriate configurations of the transparent conductive films to which the necessary field-inducing voltages are applied. In the inventive cell, however, such fields are not necessary when the cell is in either of the two stable states. When the switching field is removed, the configuration of the adjoining areas, which may not have been effectively switched, may propagate into the switched region causing it to degenerate into an undesirable state. A significant problem in the fabrication of patterned displays utilizing the inventive cell therefore involves the necessity of an appropriate technique for isolating the various regions required in a patterned display. Such a technique, suggested by applicants, is shown in FIG. 3. In this Figure, three different regions, 33, which are part of a patterned display such as an alphanumeric display, are isolated by boundary regions, 32, which have an associated cell thickness that is different than that of the display regions. (At 33, there is an exemplary transparent conductive film and an aligning surfactant deposited on a transparent substrate, 31, as described). In a specific embodiment, where the cell thickness in the boundary region is less than that in the display region, the zero degree twist configuration (See FIG. 2) will be the lowest energy state in the boundary region 32. In this embodiment, the cell will be so designed that the 360 degree configuration has the lowest energy state in the display region, 33. One may then readily see that under such conditions, the configuration of neither region will propagate beyond its boundary. In alternative embodiments, the boundary region between the display regions may have a 360 degree twist in the lowest energy state. The display regions may be in the region of the cell which have greater cell thickness such as in FIG. 3, or in regions which have lesser cell thickness. In FIG. 3 the relative energy of the states in each of the regions are determined by altering the cell thickness in these various regions. Alternatively, such control may be obtained by varying the boundary conditions of the various regions, as for example, by treating the cell walls to obtain different director tilts in the display and boundary regions.

5—OPTICAL DIFFERENTIATION

The states associated with the specific embodiments of FIGS. 1 and 2 as well as those associated with alternative embodiments may be easily distinguished optically by the use of a polarizer and an associated polarization analyzer. In the 360 degree twist state, the light usually exits the cell elliptically polarized, rather than linearly polarized, because the product of the optical anisotropy and the cell thickness divided by the wavelength is less than 15 or 5 and preferably less than 2, the contrast improving inversely with this number. In the zero degree twist state, however, the polarization of appropriately oriented plane polarized light is uneffected by the cell and the light exiting the cell will be linearly polarized due to the initial polarizer.

The need for the polarizer and analyzer may be minimized or totally avoided by inserting a dye whose optical absorptivity depends upon its relative orientation with respect to the direction of propagation and polarization of an impinging light beam. The local orientation of such a dye will be influenced by the local orientation of the liquid crystal in the various states, thereby altering the absorptivity of the dye depending upon the state of the liquid crystal and thereby providing a mechanism for optical differentiation of the various liquid crystal states. (D. L. White, et al, *J. Applied Physics* 11, 4718 (1974), G. H. Heilmeir, et al, *App. Phys. Letters* 13, 91 (1968)).

6—DISTINCTIVENESS OF THE INVENTIVE CELL

As presently envisioned, the inventive cell may be distinguished from prior art cells, which involve some form of pseudo-bistability, by the following characteristics which are present in the inventive cell in combination: (1) the liquid crystal comprises a cholesteric liquid crystal; (2) the twist of the liquid crystal in at least one of the stable states is constrained to a value other than its unstrained value; (3) in the stable states, the liquid crystal is substantially free of disclinations and walls within the addressed region, i.e., the molecular configuration of the liquid crystal is uniform across any two dimentional active surface parallel to the cell boundary, and (4) the cell may be switched between at least two stable states, which usually differ in twist by substantially 360 degrees, without passing a disclination across the active region.

Given these characteristics of the inventive cell, prior art devices, and prior attempts at bistable devices, may be easily distinguished. For example, scroll pattern devices have been recently disclosed. These devices usually comprise a cholesteric liquid crystal and a guest dye. A non-absorptive, non-scroll, uniform state is initiated by applying a uniform field. From this state, the cell may be switched to the scroll pattern absorptive state by a uniform field of a different frequency. The scroll pattern state is a disoriented state containing numerous disclinations which take on the appearance of a fingerprint when viewed from above. As a result of this configuration, the dye is disoriented and becomes absorptive, at least to some extent, for all components of light.

The scroll pattern cell is somewhat analogous to a previously described cell by H. Melchior et al, *App. Physics Letters* 21 392 (1972) in which a state with even more disclinations was used to render a guest dye absorptive. This highly disoriented state, referred to as "focal-conic", was attained by taking the liquid crystal to its isotropic liquid phase and then allowing it to cool, and return to a cholesteric state of a different texture, in the absence of a field. Cooling with a field on yielded a uniform essentially non-absorptive state. Applications of the focal-conic state involves scattering off the disclinations themselves, rather than absorption associated with the guest dye.

Both the scroll pattern and the focalconic cells differ from the inventive cell in that the stable states involve disclinations or walls. In addition, they may not be truely bistable.

A recent paper by Porte (G. Porte, et al, *J. de Phys.* 39, 213 (1978)) discusses a liquid crystal configuration that in fact has two stable states, although the reference does not appreciate their significance for device applications. These two states involve twisted nematics. The twisted states arise in part from boundary conditions which introduce splay and bend terms into the description of the untwisted state. Solutions which take into account these additional terms yield an untwisted state with increased energy, and also lower energy twisted states which are naturally preferred by the liquid crystal. In Porte's condfiguration, however, the stable states are symmetric—the twists in these states differing by $\pm pi$—and there is no known mechanism which will consistently switch the crystal between the two states in view of their symmetry. Porte's disclosure is distinguished from the inventive cell in that it involves no cholesteric crystal and in that it has no disclosed switching mechanism. In the inventive cell, there is an inherent asymmetry between the stable states, which is introduced by the twist of the cholesteric. This asymmetry then permits effective switching between the stable states.

A disclosure by Gerritsma discusses in detail a switching mechanism which is similar to that considered for use in the operation of the inventive cell. In Gerritsma's device, a nematic liquid crystal is placed in a cell which has boundaries that cause a 90 degree orientation difference in the x-y plane between the liquid crystal directors at the upper and lower surfaces. The orientation of the liquid crysal directors is parallel to this boundary wall without any significant tilt in the z direction, i.e., perpendicular to the wall surface. In Gerritsma's device, there are two or more states, which may be switched without passing through a disclination, one of which, is stable. The other states are at an increased energy and lie essentially at the top of a potential hill. These states are switched by standing up the molecules perpendicular to the cell walls in a uniform low frequency field and then causing them to fall over by the application of a vertical high frequency field. Gerritsma and van Doorn disclosed that back flow phenomena which occur during the relaxation of the liquid crystal from the vertical uniform state, would result in the switching of the crystal to a higher energy state when a higher frequency field is applied during relaxation. This higher frequency field "catches" the molecules during their short period of backward tilt due to back flow and forces them to continue to fall in the backward direction. If no field is applied during relaxation, and a low frequency field is used to attain the uniform vertical state, then the crystal will naturally recover from the back flow phenomenon and relax in the forward direction. The Gerristma cell differs from the inventive cell in that the Gerritsma cell does not involve a cholesteric and does not have two truly stable states which may be switched without passing through a disclination.

In the inventive cell, the combination of the boundary conditions, e.g., tilt from 1 or 5 to 60 degrees, and in a specific embodiment, parallel relative orientation of the constraining effect of the boundaries in the x, y direction, and the use of a cholesteric, results in two stable states, one of which may be reached from the B state by forward rotation from nearly vertical orientation at the mid plane and the other of which can be reached from the B state by backward rotation. When an exemplary low frequency field, which in the many known materials that have positive dielectric anisotropy at low frequencies causes the "vertical" B state, is turned off suddenly, the back flow phenomenon is dramatic and causes significant backward motion and relaxation to the appropriate "backward" state. If, however, the field is turned off slowly, the back flow phenomenon is less dramatic and the forward rotation predominates causing relaxation to the "forward" state. Alternative embodiments, however, may advantageously use multiple-frequency addressing, i.e., the Gerritsma switching mechanism. In such embodiments, appropriate adjustments of the various parameters may permit more rapid switching.

7—CELL DESIGN

The invention lies partly in the realization that solutions of the appropriate energy equations which describe the various possible molecular configurations in a liquid crystal cell include configurations which are stable and which can be switched from one stable solution to another. Such solutions cannot be easily obtained in closed form. Applicants' discovery of these states is rather the result of a study of the possible numerical solutions of the appropriate equations. The practitioner who desires to fabricate the inventive cell may thus be directed to solve these equations and search for the appropriate bistable solutions. Applicants, for example, have proceeded by solving the well-known Leslie Erickson equations which describe the hydrodynamic flow characteristics of a liquid crystal (D. W. Berreman *J. Appl. Physics* 46, 3746 (1975)). These equations were solved neglecting the inertial terms which were found to be negligible. Various physical constants must be supplied in the numerical solutions of these equations. These constants include three bulk elastic moduli, five viscosities which relate to the various possible relative motions between the molecules, two independent dielectric tensor components, the cell thickness, a term describing the optical anisotropy of the liquid crystal (in order to fully describe the optical properties of the cell), boundary conditions (effected in specific embodiments by appropriate treatment of the cell walls), a temporaly varying voltage which constitutes an applied energy which effects switching between the stable states, and an initial liquid crystal configuration. Clearly, there are an infinite number of possible values which one may assign to these parameters when attempting to solve the appropriate equations by numerical analysis. In order to relate any possible solutions more closely to real physical systems, applicants used as initial conditions three elastic constants associated with 4,4' dihexylazoxybenzene ("HXAB"). The viscosity constants for HXAB are unknown and consequently, those for methylbenzylidinebutylaniline ("MBBA") whch are known and believed to be typical, were used as initial conditions. For HXAB, the two tensor components are essentially identical in value and consequently, their absolute value plays a relatively insignificant role in the solution of the equations. Rather, the product of the square of the switching field strength and the difference between the dielectric tensor components becomes significant, and consequently, solutions may be normalized to this product. Other materials may have dielectric tensor components which differ significantly, and in such cases the absolute value of the tensor components are of greater significance. For example, in the currently available liquid crystal cell obtained from The British Drug House and referred to as E-7 (a cyanobyphenol mixture) the difference between the two dielectric tensor components is significant (differing by a factor of as much as 3) and in solutions assuming this liquid crystal the known values of the two dielectric tensor components were used. Initial solutions of the energy equations assumed a 110 degree unstrained twist over the cell thickness with a tilt of 45 degrees. The directors were thus assumed to be tilted at 45 degrees relative to the boundary walls but were rotated relative to each other as dictated by the assumed twist along a direction perpendicular to the cell surfaces. A cell thickness of approximately 10 microns was assumed. With hindsight, it can now be stated that easier starting conditions are those which more closely approximate what applicants refer to as state A, with a finite tilt preferably in the neighborhood of 1–60 degrees, 2–60 degrees, 5–60 degrees or 25–45 degrees.

Additional instructions which would assist the practitioner in obtaining the bystable solutions include the observations that (1) the two stable states usually differ in twist by 360 degrees, although in reality, the departure from rigidity in real boundary conditions may permit this parameter to be less than 360 degrees by as much as 10 degrees or more; and (2) the twist torque exerted on the liquid crystal molecules by the assumed boundary conditions differs in sense between the two stable states.

The configurations associated with the two stable states may be obtained by solving the known Oseen-Frank equations (de Gennes, *"Physics of Liquid Crystals"* Oxford University Press (1975), p. 243)), with the addition of an optional field energy term. These equations require the assumption of three elastic constants, two independent dielectric tensor components, the cell thickness, appropriate boundary conditions and any static voltage electric displacement present.

MBBA, HXAB and E-7 are nematic liquid crystals and consequently, exemplary methylbutoxiazoxybenzene ("MBAB") or colesterol nananoate, must be added in actual embodiments to obtain the requisite cholesteric characteristics. The amount of such materials that are added determines the ultimate composition's helicity. This natural helicity of the material due to its cholesteric nature must be assumed as a constant in both the solution of the Oseen-Frank equations and the Leslie-Erickson equations.

The numerical solution of the appropriate equations described above constitute in a very real sense a type of experimental search for the inventive bistable states. Various "experiments" are simulated on the computer to search for the desired bistable solutions. However, in a similar sense, and in a technique more appropriate to the practitioner with laboratory expertise, these experiments may be equally well-performed in the laboratory with real materials and appropriate cells. Consequently, the following laboratory directions are provided for those practitioners who seek the more traditional laboratory techniques for studying this invention.

The first step in the experimental fabrication of the cell requires a determination of the approximate helicity of the unstrained liquid crystal over the cell thickness to be used. As discussed above, a wide range of such unstrained helicities may be used in inventive embodiments. However, for the purpose, of obtaining a specific embodiment, an approximately 180 degree unstrained helicity was used. The determination of the unstrained twist of the liquid cyrstal for the cell thickness which will ultimately be operable usually requires some experimentation.

The natural helicity of a liquid crystal composition was determined as a function of the amount of the various components of the mixture by observing the position of the Grandjean Cano discontinuity (de Gennes, supra, FIG. 6.20) in a thin layer confined between a lens of shallow positive curvature and a flat surface. The cell thickness which was to be used was approximately 40 microns and consequently a composition with a natural pitch of 80 microns was selected. This material was then placed in a wedged cell formed from $\frac{1}{8}$ inch glass with a conductive film of indium oxide and tin oxide on the inside surface of the glass. Silicon monoxide had been evaporated over the conductive film at an oblique angle ($\sim 5$ degrees) from parallel, to what would be a thickness of approximately 2000 Angstroms if the silicon monoxide were deposited perpendicularly. This deposition provides the necessary alignment mechanism to obtain the desired tilt in the z direction and orientation in the xy direction. The thickness of the wedge cell varied from 30–50 microns.

The composition is then placed within the cell in one of the bistable states, i.e., state A or C. This is done by placing the liquid crystal composition in the cell at a temperture above the nematic isotropic transition temperature. The liquid crystal is consequently in the isotropic state. Removal of the heat source then results in the cooling of the liquid crystal to room temperature. Following this procedure, the liquid crystal can be switched to either the A state or the C state subsequent to the application of a field which raises the molecule to the B state. (Alternatively, the liquid crystal may be exposed to a magnetic field above the critical field for untwisting the cholesteric (de Gennes, supra p. 247) during cooling.))

Subsequent to the insertion of the liquid crystal in the cell according to the above procedure, the liquid crystal was transformed to the B state by the application of an exemplary 60 Hz electric field with a magnitude of 10–100 volts depending on the liquid crystal composition. The cell was then repetitively switched from the A state to the C state as described above and regions of the cell were searched where the two states could be optically differentiated through the use of a polarizer in conjunction with an analyzer. Definition of a region where such optical differentiation could be obtained then allows the practitioner to obtain the operable cell thickness for the given liquid crystal composition and cell boundary conditions used. A cell of this uniform thickness may then be constructed for this liquid crystal composition, for the obtained boundary conditions, and for the particular switching technique chosen. The cell which is ultimately constructed may have the confining boundaries described in the discussion of FIG. 3 in order to obtain, for example, an appropriate alaphnumeric display.

EXAMPLE 1

In this example, the inventive liquid cell was fabricated using glass slides as the cell boundaries. A glass slide was overcoated with indium-tin oxide for use as a means to apply the switching field. This transparent conductive film was then further overcoated with silicon monoxide in order to provide the required aligning influence. The silicon monoxide was evaporated on the glass slide at an angle of 5 degrees from the glass surface. A calibration surface placed within the evaporation apparatus and oriented normal to the evaporating silicon monoxide source showed a 2200 Angstrom deposit.

A second cell surface was similarly prepared with, however, the significant difference that this second indium-tin oxide coated glass was first dipped in a aquious, N dimethyl-N-octadecyl-3-aminopropyltrimethoxisilyl chloride (DMOAP), which is known to produce homeotropic alignment of the liquid crystals. A spot approximately ⅜ inch in diameter on this surface was coated by oblique evaporation of silicon monoxide as in the first slide. This processing of the second slide yields in the fabricated cell an active region defined approximately by the silicon monoxide evaporated spot on ths second slide. The remainder of the second slide which yields homeotropic alignment provides an effective and stable boundary for the active region of the cell.

The two glass slides were then separated by a thin layer of epoxy which was placed along the boundary of the structure in an appropriate "horseshoe" configuration. The slides were oriented with the indium-tin oxide surfaces facing each other and the epoxy was cured by placing the structure in an 80 degree C. oven while clamped between wooden blocks. The deposited, orienting surfaces were aligned at 180 degrees, i.e., the surfaces were oriented so that the directions from which the silicon monoxide had been evaporated differed by 180 degrees.

After curing, the thickness of the completed cell was measured by observing interference fringes of monochromatic light using a calibrated variable wavelength monochrometer as the light source. The thickness in the region defined by the silicon monoxide spot on the second slide ranged from 40–47 microns. It was expected that bistability would occur for a liquid crystal with an unstrained pitch of approximately 180 degrees in the cell gap. Consequently, a mixture of 3.03 percent MBAB in E-7 which yields a ½ pitch of approximately 43 microns was used.

The glass and epoxy cell was pumped down to a vacuum of approximately one Torr using a mechanical vacuum pump and heated to approximately 70 degrees C. The open space between the two glass walls was filled with a liquid crystal mixture by capillary action through the open end of the horseshoe enhanced with air pressure when the vacuum was released. Thin wire electrodes were connected to the two surfaces by means of a wire and a conductive silver paste, and a variable voltage transformer was appropriately connected.

Initially, the cell showed domains associated with the A, C and D states when the voltage was turned off. Repeated applications of the field, however, eventually produced a cell with a uniform A or C state. Once a uniform state was obtained, switching between the two stable states was achieved by varying the turn-off rate of the field. The C state was thereafter obtained by turning off a 15 volt peak to peak, 60 Hz voltage using a toggle switch. The A state was obtained by turning the same voltage off slowly over approximately a one second time period using a variable voltage transformer.

EXAMPLE 2

A cell similar to that of example 1 was fabricated in this example using 1.15 percent MBAB dissolved in HXAB as the liquid crystal composition. The cholesteric pitch associated with this composition is 62 microns. The thickness of this cell was not uniform and operation occured in a region of estimated thickness of 30 microns. Regions of lesser thickness remain in state A even after switching the active region. This demonstrated the use of a variable cell thickness in defining boundaries of a patterned display.

EXAMPLE 3

The cell of example 2 was switched from state B to state C using a high frequency field. To understand this mechanism, it should be noted that the mixture of MBAB in HXAB shows a reversal of dielectric anisotropy at frequencies above 300 kHz. Consequently, frequencies below this value will raise the liquid crystal directors to the configuration of state B. From this point, state A or C may be obtained depending upon whether the field is turned off slowly or rapidly as in Example 1.

In this example, however, the low frequency field was turned off and a high frequency field of 1500 kHz was immediately turned on. This technique resulted in transitions from states B to C over a larger portion of the cell than was obtained by sudden off-switching alone. If the same high frequency field is applied after approximately a ¼ second delay subsequent to turn-off of the low frequency field, the cell switches to the A state. This switching mechanism is similar to that used by Gerritsma in that a low frequency field is used to obtain the intermediate B state while a high frequency field depending upon its time of application yields either the A or C state.

EXAMPLE 4

A third cell was fabricated using a mixture comprising 0.596 percent cholesterol nonanoate in E-7. The cell thickness was between 20 and 30 microns. Switching from the B state to the A state was obtained by slowly turning off a 12 volt peak-to-peak 60 Hz volage as above. Thicker regions of this cell remained in the C state once again demonstrating the boundary phenomena discussed above.

We claim:
1. A liquid crystal cell comprising
(1) a liquid comprising liquid crystal; and
(2) bounding surfaces which align liquid crystal adjacent the surfaces, and which include means to apply switching energy; the invention characterized in that the liquid crystal comprises a cholesteric liquid crystal, in that the cell has at least two stable states, in that the twist of the liquid crystal is constrained to a value other than its unstrained value in at least one of the stable states, in that the liquid crystal is substantially free of disclinations and walls in the stable states, and in that the cell may be switched between at least two stable states without passing a disclination across the active region.

2. The cell of claim 1 wherein the unstrained pitch of the liquid crystal over the cell thickness is between 90–270 degrees.

3. The cell of claim 2 wherein the unstrained pitch of the liquid crystal over the cell thickness is 180±10 degrees.

4. The cell of claim 2 wherein the difference in pitch between the two stable states is approximately 360 degrees.

5. The cell of claim 4 wherein in the stable states, the tilt of the liquid crystal directors at the boundaries is between 1 and 60 degrees as measured from the cell wall.

6. The cell of claim 5 wherein the tilt of the liquid crystal directors is between 25 and 45 degrees.

7. The cell of claims 2 or 4 wherein the product of the optical anisotropy and the cell thickness divided by the wavelength of impinging light is less than 5.

8. The cell of claim 1 further including means to vary the fall time of a field applied to the active region of the cell.

9. The cell of claim 1 wherein the parameters of the cell and of the liquid crystal are such that there are constraints on the liquid crystal, interposed by the bounding surfaces, to yield a state to which the liquid crystal may be brought with energy sufficiently high such that the liquid crystal spontaneously decays to a stable state of lower energy.

10. The cell of claim 1 wherein the thickness of the cell varies along the extent of the cell to define boundary regions and thereby yield a patterned display.

11. The cell of claim 1 wherein the aligning mechanism associated with the bounding surfaces varies along the extent of the cell to define boundary regions and thereby yield a patterned display.

* * * * *